(12) United States Patent
Han et al.

(10) Patent No.: US 7,871,488 B2
(45) Date of Patent: Jan. 18, 2011

(54) WATERBORNE ADHESIVE

(75) Inventors: Qiwen Han, East Brunswick, NJ (US); Charles W. Paul, Madison, NJ (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 11/640,734

(22) Filed: Dec. 18, 2006

(65) Prior Publication Data

US 2008/0146710 A1 Jun. 19, 2008

(51) Int. Cl.
*B29C 65/00* (2006.01)
*B32B 37/00* (2006.01)
*C08J 5/00* (2006.01)
*C09B 67/00* (2006.01)
*C08L 29/04* (2006.01)
*D21H 21/14* (2006.01)
*C04B 24/26* (2006.01)

(52) U.S. Cl. .................. 156/307.1; 524/502; 524/503; 524/803

(58) Field of Classification Search ............... 524/502, 524/503, 803; 156/307.1
See application file for complete search history.

(56) References Cited

U.S. PATENT DOCUMENTS

| | | | | |
|---|---|---|---|---|
| 5,182,328 A | * | 1/1993 | Iacoveillo et al. | ......... 524/803 |
| 5,266,611 A | * | 11/1993 | Teschendorf | ........... 523/416 |
| 5,795,933 A | * | 8/1998 | Sharp et al. | ........... 524/596 |
| 6,753,383 B2 | * | 6/2004 | Schaefer et al. | ........... 525/349 |
| 2004/0146674 A1 | * | 7/2004 | Howell et al. | ........... 428/35.7 |
| 2005/0215700 A1 | * | 9/2005 | Faust et al. | ........... 524/557 |
| 2006/0141236 A1 | * | 6/2006 | Nakamura et al. | ....... 428/304.4 |

FOREIGN PATENT DOCUMENTS

WO WO 2006/086365 A1 * 8/2006

OTHER PUBLICATIONS

Material Safety Data Sheet: Acetaldehyde.*
http://www.scorecard.org/chemical-profiles/html/acetaldehyde.html.*
http://www.arb.ca.gov/research/indoor/ab1173/comments1104/ResilientFloor-11.pdf.*
http://web.archive.org/web/20060723194318/http://www.sciencelab.com/xMSDS-Acetaldehyde-9922768.*
Robert W. Layer. Chemical Reviews, The Chemistry of Imines, vol. 63, 1963, pp. 489-510.

* cited by examiner

*Primary Examiner*—Philip C Tucker
*Assistant Examiner*—Michael N Orlando
(74) *Attorney, Agent, or Firm*—Sun Hee Lehmann

(57) ABSTRACT

Novel waterborne adhesives comprising a crosslinkable polymer, a crosslinking agent and acetaldehyde scavenger are useful in the manufacture of products exhibiting reduced acetaldehyde emission rates. Manufactured products having acetaldehyde emission rates of less than 9 $\mu g/m^3$ may be manufactured using the adhesive of the invention.

7 Claims, No Drawings

WATERBORNE ADHESIVE

FIELD OF THE INVENTION

The invention relates to crosslinkable waterborne adhesives that show reduced emission levels of acetaldehyde when used in woodworking applications.

BACKGROUND OF THE INVENTION

Waterborne formulas based on poly(vinyl acetate-co-N-methylolacrylamide), abbreviated herein as poly(VAc-co-NMA) or PVAc, are conventionally used in woodworking applications such as, for example, millwork, furniture, doors, panels, and floors. The use of these types of adhesives, however, result in products having significant, and in some jurisdictions unacceptably high, acetaldehyde emission levels. For example, current flooring PVAc adhesives typically contain 100-500 ppm acetaldehyde, which represents an emission rate of more than 27 $\mu g/m^3$ in office or classroom constructions. Recently enacted California regulations requires an emission rate less than 9 $\mu g/m^3$. As such, in order to meet increasingly restrictive environmental requirements, such as that required in California, there is a need in the art for low-acetaldehyde PVAc adhesives. The current invention fulfills this need in the art.

SUMMARY OF THE INVENTION

The present invention provides useful waterborne adhesives comprising an effective amount of an acetaldehyde scavenger which when used in woodworking end use applications, provide superior performance in terms of acetaldehyde emission levels. Adhesive formulations comprising the scavenger can be used to manufacture articles having acetaldehyde emission levels less than 20 $\mu g/m^3$. Embodiments of the invention directed to adhesives that can be used to manufacture articles having acetaldehyde emission lower than 9 $\mu g/m^3$ are particularly advantageous as such articles will meet the strict standards now required in some jurisdictions.

One embodiment of the invention is directed to a waterborne adhesive comprising a crosslinkable polymer, a crosslinking agent and an acetaldehyde scavenger. In one aspect, the adhesive of the invention comprises a crosslinkable acetate polymer, in particular a crosslinkable vinyl acetate copolymer such as N-methylolacrylamide vinyl acetate copolymer. A preferred scavenger for use in the practice of the invention is an aromatic amino amide. In one preferred embodiment, the scavenger is 2-aminobenzamide.

Another aspect of the invention is directed to articles manufactured using a waterborne adhesive comprising a crosslinkable polymer, a crosslinking agent and an acetaldehyde scavenger. Articles manufactured out of wood, such as flooring for example, will have an acetaldehyde emission rate of less than 20 $\mu g/m^3$, more typically acetaldehyde emission rates of less than 9 $\mu g/m^3$.

Still another aspect of the invention is directed to a method of bonding one wooden substrate to a second substrate. In one embodiment, the second substrate is a wood substrate. In another embodiment the second substrate is a non-wooden substrate. The method of the invention comprises applying a waterborne adhesive to at least a portion of a first or second substrate, contacting said first substrate to said second substrate such that the adhesive is in contact with both the first and the second substrate and, optionally, applying pressure to effect said bonding together. In some embodiments, the assembly is subjected to heat to accelerate bonding strength development. The adhesive used in the practice of this method is a waterborne adhesive comprising a crosslinkable polymer, a crosslinking agent and an acetaldehyde scavenger.

DETAILED DESCRIPTION OF THE INVENTION

The invention provides the art with a novel waterborne adhesive that may advantageously be used in woodworking applications. Under conventional woodworking application conditions, the adhesives of the invention show an acetaldehyde emission rate of less than about 9 $\mu g/m^3$ as determined according to "Standard Practice for the Testing of Volatile Organic Emissions from Various Sources Using Small-Scale Environmental Chambers." CA/DHS/EHLB/R-174, the revised and updated indoor air quality portion of California's Special Environmental Requirements, "Specification Section 01350."

The adhesive of the invention also provides sufficient bonding strength for bonding together substrates made of wood. It is to be understood that the term "wood" is being used generically and encompasses all types of wood as well as wood-containing composites, engineered wood, particle board and the like.

The adhesive of the invention provides the art with an adhesive system that has good water resistance required by e.g., the wood paneling and furniture markets. Adhesives useful in the practice of the invention will generally exhibit greater than 50% wood tear, more typically greater than 75% wood tear, even more preferred for use are adhesives exhibiting complete substrate failure (100% wood tear) with no cohesive failure. The strength of the resulting bond will typically be greater than 30 pounds per linear inch (pli), more typically greater that 50 pli, and even more typically greater than 100 pli. They also pass the American National Standard for hardwood and decorative plywood, ANSI/HPVA HP-1-1999, for Type II plywood glue bond requirements.

The adhesives of the invention comprise a crosslinkable polymer and a crosslinking agent, and will also contain an effective amount of an acetadehyde scavenger. In one embodiment the scavenger is a unique aromatic amino amide. The amino group on the scavenger molecule reacts with aldehyde to form imine and water. While known amino and/or amide agents compounds react with aldhyde to form imine and water, this reaction is reversible and will regenerate aldehyde at low pH's (e.g., at pH 2-5 as normal specification for woodworking PVAc adhesives) and high temperatures (>170° F. as normal application conditions for woodworking PVAc adhesives), the scavenger of the invention is unique in that it provides effective aldehyde scavenging without the reverse reactions observed under low pH's and/or high temperatures.

Scavengers that can be used in the practice of the invention are compounds that function to reduce acetaldehyde levels by consuming, reacting with or binding acetaldehyde in a permanent, i.e., not reversible, way under conditions of use. Useful scavengers include organic additives that have hindered amine and/or amide functional groups, non-limiting examples include 2-aminobenzamide, N-acetylglycinamide, 3-allyl-1-amino-2-thioxo-imidazolidin-4-one, 4-amino-3-hydroxybenzoic acid, 2-amino-1H-imidazole-4-propionic acid, 2-amino-3-(1H-indol-3-yl)-propionic acid, 2-amino-2-methyl-1,3-propanediol, 6-amino-1-methyl-pyrimidine-2,4-dione, 6-amino-1H-pyrimidine-2,4-dione, biuret, 1,2-diaminoanthraquinone, 1,4-diaminoanthraquinone, 1,5-diaminoanthraquinone, 3,4-diaminobenzoic acid, 6-amino-1,3-dimethyl-2,4-(1H,3H)-pyrimidinedione, 2,4-diamino-6-hydroxypyrimidine, 1,8-diaminonaphthalene, 2,3- diaminopyridine, 4,5-dihydroxy-2,7-naphthalenedisulfonic acid or salts, 4,6-dimethoxypyrimidin-2-amine, (2,5-dioxoimidazolidin-4-yl)-urea, N,N'-diphenylethane-1,2-diamine, 2-hydroxybenzamide, 2-hydroxy-N-phenylbenzamide, 2-mercaptobenzamide, 3-methyl-5-methylsulfanyl-3H-imidazole-4-carboxylic acid amide, 2-phenylenediamine, propanediamide, thiourea, triuret, urea condensation compounds, or mixtures or combinations thereof. In one preferred embodiment the adhesive comprises 2-aminobenzamide as the acetaldehyde scavenger.

In one embodiment a crosslinkable polymer (e.g., a N-methylolacrylamide containing polymer) and a crosslinking catalyst (e.g., acid catalyst) is used. Alternatively, the crosslinkable polymer may be a polymer containing functional groups containing reactive hydrogen moieties, such as —COOH, —OH and —NH$_2$, and the crosslinking agent may be a metal catalyst (e.g., a salt of titanium, aluminum, zinc, zirconium). A reactive hydrogen, as this term is conventionally used and understood in the art, means any hydrogen that can react with a Grignard reagent, see e.g., March, J., Advanced Organic Chemistry: reactions, mechanisms and structure, 4.sup.th edition, John Wiley & Sons, 1992, page 623. Based on the disclosure of the current invention, those of skill in this art would recognize other suitable crosslinkable polymers and crosslinking agents that can be used in the practice of the invention.

Base resin candidates found to be particularly useful in formulating adhesives of the invention are functionalized polymer emulsions, and include vinyl acetate polymer emulsions; vinyl acetate copolymer emulsions, such as vinyl-N-methylolacrylamide copolymer emulsions, ethylene-vinyl acetate copolymer emulsions, ethylene-vinyl acetate-N-methylolacrylamide copolymer emulsions, vinyl acetate-maleic ester copolymer emulsions, vinyl acetate-acrylic copolymer emulsions, and vinyl acetate-versatate copolymer emulsions; ethylene-vinyl acetate-vinyl chloride copolymer emulsions; acrylic emulsions, such as styrene acrylic emulsions, and vinyl acrylic emulsions; butadiene copolymer emulsions, such as styrene-butadiene copolymer emulsions, and carboxylated butadiene copolymer emulsions; natural rubber emulsions; chloroprene homopolymer or copolymer emulsions; polyurethane dispersions; or other types of emulsions; or mixtures or combinations thereof. Functional groups on the polymers include: carboxylic acid, hydroxyl, amine, carbonyl, N-methylol amide, aldehyde, thiol, or other chemical groups, or mixtures or combinations thereof.

In one embodiment the adhesive comprises all vinyl-acetate (co)polymers. Particularly preferred adhesive formulations comprise vinyl acetate containing polyvinyl alcohol colloidal groups. These copolymers are typically synthesized from, but not limited to, vinyl acetate and N-methylolacrylamide (NMA). Other copolymers in the NMA family that can be used to prepare acetate copolymers include N-methylolmethacrylamide (NMMA), N-(alkoxymethyl)-acrylamides, N-(alkoxymethyl)-methacrylamides and esters of N-methylol(meth)acrylamide. The copolymers are formulated with a crosslinker for cohesive strength as well as for heat and water resistance. The reactive nature of the functional groups help crosslinking so as to give cohesive strength.

Crosslinkable acetate polymers for use in adhesive of the invention include but are not limited to NMA-vinyl acetate copolymer, NMMA vinyl acetate copolymer and NMA-ethylene-vinyl acetate copolymer.

Non-crosslinkable polymers may also be used in the formulations of the invention. Such polymers include but are not limited to vinyl acetate homopolymers and ethylene vinyl acetate copolymer. Both water soluble and non-water soluble polymers are contemplated for use.

The choice of the water-soluble polymers is not critical to the practice of the invention. The water soluble polymer is chosen to be amorphous or have a low crystallinity, and to be compatible with the crosslinkable copolymer. Typical water soluble polymers include poly vinyl alcohol, poly vinyl pyrrolidone, poly acrylamide, and combinations thereof. Other classes are known to be fully compatible but are not widely practiced. These include urea, hydroxy alkyl urea, etc. A preferred water soluble polymer for use in the practice of the invention is polyvinyl alcohol. The polyvinyl alcohol for use in the invention will be at least partially hydrolyzed. Preferably, the degree of hydrolysis degree of hydrolysis will be at most 99% or less, preferably 88% or less. Polyvinyl alcohol is commercially available from Kuraray, DuPont, Celanese and others. The ratio of water soluble polymer to acetate (co) polymer will be selected to give the right balance of water resistance and final bonding strength.

The use of a crosslinker adds to the cohesive strength and helps in the high temperature performance and water resistance of the adhesives. Typical crosslinkers for use in the practice of the invention include acid catalysts such as aluminum chloride, aluminum nitrate, p-toluene sulfonic acid (p-TSA), sulfamic acid, and combinations thereof. The ratio of crosslinker to acetate polymer is selected to give the right balance of crosslinking strength, and the stability under high temperatures and high humidity environment. Also useful are acids, such as sulfuric acid; phosphoric acid; nitric acid; aluminum chloride; ⅓ basic aluminum chloride; ⅔ basic aluminum chloride; sulfonic acids, such as p-toluene sulfonic acid; organic acids; amines; hydrides; isocyanates; or aziridines; or mixtures or combinations thereof.

Adhesive formulations will optionally contain conventional additives including but not limited to fillers, including organic fillers such as polysaccharide fillers and inorganic fillers such as minerals and synthetic compounds; plasticizers; acids; waxes; synthetic resins; tackifiers; defoamers; preservatives; dyes; pigments; UV indicators; and other additives commonly used in the art.

Useful hardeners that may be used include phenol-formaldehyde resins, resorcinol-formaldehyde resins, urea-formaldehyde resins, or melamine-formaldehyde resins, or mixtures or combinations thereof.

Preservatives for use herein include those conventionally used in aqueous adhesives such as benzoates, amides and fluorides such as sodium fluoride. Also included are the hydroxybenzoic acid esters such as p-hydroxybenzoic acid methyl ester or p-hydroxybenzoic butyl ester. Commercially available preservatives which may be used in the practice of the invention include KATHON LXE sold by Rohm & Haas Company and Nipacide OBS sold by Clariant. The preservative will generally be included in amounts of from 0.05% to about 0.2% by weight.

A typical adhesive formulation will comprise from about 20 to about 98%, more typically from about 70 to about 95%, by dry weight of a crosslinkable acetate polymer, NMA-vinyl acetate copolymer being particularly preferred, and from about 0% to about 10%, more typically up to about 3%, by dry weight of a polyvinyl alcohol. The adhesive formulation will typically also comprise a defoamer in amounts of up to about 1% by dry weight, more typically from about 0.01 to about 0.5.

The adhesive composition of the invention is useful for bonding articles composed of a wide variety of porous substrates (materials). The adhesive is particularly useful in bonding together substrates in which one or both substrates is made of wood. In the practice of the invention, adhesive is applied to at least one of two substrates to be bonded together.

The adhesive product can be applied to a substrate by a variety of methods including coating or spraying in an amount sufficient to cause the article to adhere to another substrate. The adhesive formulations may be applied in a continuous or discontinuous, e.g., as evenly spaced beads or dots, manner depending on surface area and coating weight desired. Particular patterns may be used to optimize substrate/adhesive contact. Depending on the adhesive, the bead size, thickness, distance apart and pattern will vary. The adhesive may be applied to the substrate by any method known in the art, and include, without limitation vacuum coating, slot-coating, swirl spraying, extrusion, contact extrusion, atomized spraying, gravure (pattern wheel transfer) and screen printing. The method of application of the adhesive to the substrate is not critical to the practice of the invention. Coating thickness will typically vary from about 0.1 to about 100 mil, more preferably from about 0.5 to about 20 mil.

The adhesive is applied to a substrate while in its liquid state and allowed to dry to harden the adhesive layer and bind the substrates together. The adhesive can be allowed to air dry or can be dried by other conventional means, such as with the use of ovens or hot press.

The adhesive formulations of the invention may be used to bond one substrate to a second similar or different substrate. Preferred are porous substrates, in particular wood. The term "wood" is used broadly to include wood composites and particle board and encompass chipboard, particleboard, medium density fiberboard, high density fiberboard, oriented strandboard, hardboard, hardwood plywood, veneer core plywood, isocyanate or phenolic impregnated strawboard, and wood composites made from woodfiber and polymers, such as recycled polyethylene.

The adhesive of the invention may be applied to various articles of manufacture and can advantageously be used to bond substrates together. The invention provides a process of bonding a first substrate to a second substrate. The process of the invention comprises applying a waterborne adhesive to at least a portion of a first or second substrate, contacting said first substrate to said second substrate such that the adhesive is in contact with both the first and the second substrate and, optionally, applying pressure to effect said bonding together. In certain embodiments, the assembly may be subjected to heat in order to accelerate the bonding strength development. The adhesive used in the practice of this method is an adhesive comprising water, a crosslinkable polymer, a crosslinking agent and an acetaldehyde scavenger. In one embodiment the adhesive comprises vinyl acetate N-methylolacrylamide copolymer as the crosslinkable polymer and 2-aminobenzamide as the acetaldehyde scavenger.

The invention will be described further in the following examples, which are included for purposes of illustration and are not intended, in any way, to be limiting of the scope of the invention.

EXAMPLE

A master adhesive formulation (designated $F_0$) having the formula set forth in Table I was prepared in a beaker equipped with a stirring blade. X-LINK®2038 (base resin) was added into the beaker and agitation stated at 10 RPM. Water was added and mixed for 5 minutes after which the speed was increased to 60 RPM. Foamaster 111 (antifoaming agent) was added. 50% water solution of diethylenetriaminepentaacetic acid and pentisodium salt (complexing agent) was next added. The agitation speed was then increased to 80 RPM. The hydrous aluminum silicate, walnut shell flour, and Melojel components (fillers) were added, and then agitated for 30 minutes. The agitation speed was then reduced to 60 RPM. Arofene 72155-W-55 (hardener) was added, and then the mixture of phosphoric acid and water (1:1 by weight) for pH adjustment. Agitatation was continued for 60 minutes after which agitation was stopped and the formulation was transferred into sealed bottles for storage, use, or testing.

TABLE 1

| Formula | $F_0$ |
|---|---|
| X-LINK ® 2038, Vinamul PVOH stabilized PVAc/NMA emulsion (Clanese Corporation) | 90.05 |
| Water | 1.69 |
| Hydrous aluminum silicate, 1.5 µm average diameter (Engelhard Corporation) | 2.50 |
| Walnut shell flour, 7.6 µm average diameter (Agrashell, Inc.) | 1.25 |
| Diethylenetriaminepentaacetic acid, pentasodium salt (Dow Chemical Company) | 0.20 |
| Arofene 72155-W-55, Phenol-formaldehyde resin (Ashland Chemical Company) | 3.06 |
| Foamaster 111 (Cognis Corporation) | 0.20 |
| Melojel; Corn starch (National Starch and Chemical Company) | 1.02 |
| PHOSPHORIC ACID, 75% FCC (Rhodia, Inc.) | 0.03 |

Formulations $F_1$, $F_2$, and $F_3$ were prepared in a beaker equipped with a stirring blade by adding master adhesive formulation $F_0$ into the beaker and agitating to 80 RPM. 2-aminobenzamide in the amounts shown in Table 2 was then added and agitated for 30 minutes. Agitation was then stopped and the adhesive formulations transferred into sealed bottles for storage, use, or test.

TABLE 2

| Formula | $F_1$ | $F_2$ | $F_3$ |
|---|---|---|---|
| $F_0$ | 100.05 | 50.01 | 350.08 |
| 2-Aminobenzamide (Sigma-Aldrich, Inc.) | 0.20 | 0.47 | 6.62 |
| 2-Aminobenzamide weight percentage in formula | 0.20% | 0.93% | 1.86% |

Formulations $F_{1C}$, $F_{2C}$, and $F_{3C}$ were prepared from formulations $F_1$, $F_2$, and $F_3$, respectively, by adding adhesive formulations $F_1$, $F_2$, and $F_3$ into beakers equipped with a stirring blade and agitating to 80 RPM. 28% AlCl3 water solution (catalyst) in the amounts shown in Table 3 was then added to the beakers and agitated for 2 minutes. Agitation was then stopped and the adhesive formulations transferred into sealed bottles.

TABLE 3

| Formula | $F_{1C}$ | $F_{2C}$ | $F_{3C}$ |
|---|---|---|---|
| F1 | 10.00 | | |
| F2 | | 10.00 | |
| F3 | | | 10.00 |
| 28% AlCl3 water solution | 0.50 | 0.50 | 0.50 |

Adhesive samples $F_0$, $F_1$, $F_2$, $F_3$, $F_{1C}$, $F_{2C}$, and $F_{3C}$ were tested for acetaldehyde content using gas chromatography with internal stand quantitation. Results are shown in Table 4.

TABLE 4

| | Formula | | | | | | |
|---|---|---|---|---|---|---|---|
| | $F_0$ | $F_1$ | $F_2$ | $F_3$ | $F_{1C}$ | $F_{2C}$ | $F_{3C}$ |
| Acetaldehyde content (ppm) | 420 | 76 | <1 | <1 | 36 | 3 | <1 |

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A waterborne adhesive comprising
   a crosslinkable polymer,
   a crosslinking agent,
   an acid catalyst, and
   a 2-aminobenzamide as an acetaldehyde scavenger in an amount effective to reduce acetaldehyde emission levels to less than or equal to 3 ppm, and wherein the acid catalyst is present in the adhesive in amount effective to produce a pH range of 2-5.

2. The adhesive of claim 1 wherein the crosslinkable polymer is a crosslinkable vinyl acetate copolymer.

3. The adhesive of claim 2 wherein the crosslinkable vinyl acetate copolymer is vinyl acetate N-methylolacrylamide copolymer.

4. An article manufactured using a waterborne adhesive, said adhesive comprising a crosslinkable polymer a crosslinkable agent, an acid catalyst, and a 2-aminobenzamide as an acetaldehyde scavenger to less than or equal to 3 ppm, and wherein the acid catalyst is present in the adhesive in amount effective to produce a pH range of 2-5.

5. The article of claim 4 wherein the adhesive comprises a crosslinkable vinyl acetate copolymer.

6. The article of 5 wherein the crosslinkable vinyl acetate copolymer is vinyl acetate N-methylolacrylamide copolymer.

7. The article of claim 6 which comprises wood.

* * * * *